United States Patent [19]
Pombo et al.

[11] Patent Number: 5,799,256
[45] Date of Patent: Aug. 25, 1998

[54] BATTERY SAVING METHOD AND COMMUNICATION DEVICE USING PREDICTION OF USER LOCATION, MOVEMENT AND ACTIONS

[75] Inventors: Raul A. Pombo, Grayslake, Ill.; Paul D. Marko, Pembroke Pines, Fla.

[73] Assignee: Motorola, Inc., Schaumburg, Ill.

[21] Appl. No.: 678,432

[22] Filed: Jul. 17, 1996

[51] Int. Cl.⁶ ................................. H04B 1/38
[52] U.S. Cl. .................. 455/574; 370/311; 455/38.3; 455/343; 455/437
[58] Field of Search ............... 455/572, 573, 455/574, 127, 343, 38.3, 434, 435, 436, 437; 370/311

[56] References Cited

U.S. PATENT DOCUMENTS

| | | | |
|---|---|---|---|
| 4,964,121 | 10/1990 | Moore | 370/311 |
| 5,128,938 | 7/1992 | Borras | 370/311 |
| 5,142,695 | 8/1992 | Roberts et al. | 455/437 X |
| 5,152,006 | 9/1992 | Klaus | 455/574 |
| 5,155,479 | 10/1992 | Ragan | 455/343 X |
| 5,175,870 | 12/1992 | Mabey et al. | 455/67.1 |
| 5,241,691 | 8/1993 | Owen | 455/343 X |
| 5,251,325 | 10/1993 | Davis et al. | 455/38.3 |
| 5,252,963 | 10/1993 | Snowden et al. | 340/825.44 |
| 5,265,270 | 11/1993 | Stengel et al. | 455/343 |
| 5,301,225 | 4/1994 | Suzuki et al. | 455/343 X |
| 5,375,254 | 12/1994 | Owen | 455/343 X |
| 5,392,457 | 2/1995 | Davis et al. | 455/38.3 |
| 5,491,837 | 2/1996 | Haartsen | 455/437 X |
| 5,519,762 | 5/1996 | Bartlett | 455/343 X |
| 5,524,009 | 6/1996 | Tuutijarvi et al. | 455/436 X |
| 5,528,664 | 6/1996 | Slekys et al. | 455/452 |
| 5,528,667 | 6/1996 | Steffensen et al. | 455/573 X |
| 5,572,221 | 11/1996 | Marlevi et al. | 342/457 |
| 5,627,882 | 5/1997 | Chien et al. | 455/574 X |
| 5,634,192 | 5/1997 | Meche et al. | 455/437 |

*Primary Examiner*—Thomas J. Mullen, Jr.
*Attorney, Agent, or Firm*—John G. Rauch

[57] ABSTRACT

A method and apparatus reduces power consumption in a portable communication device (104) by predicting a user's location, movement and actions. The portable communication device (104) is powered by a battery (120) and includes a battery control (122) for decoupling portions of the communication device (104) from the battery. Historical records of control channel and call activity are maintained in memory (117) at the communication device (104). This data is used to predict calls. This permits the communication device (104) to conserve power in the battery (120) when no call activity is likely. The stored data is also used to predict what control channels should be scanned to search for a nearby base station (102). This permits the communication device (104) to scan a reduced number of control channels and reduces the time duration necessary for powering up the receiver (108) of the communication device (104).

20 Claims, 8 Drawing Sheets

BATTERY SAVING METHOD AND COMMUNICATION DEVICE USING PREDICTION OF USER LOCATION, MOVEMENT AND ACTIONS

FIELD OF THE INVENTION

The present invention relates generally to battery operated communication devices. The present invention relates more particularly to a method for conserving battery power in a battery-operated communication device such as a radiotelephone handset.

BACKGROUND OF THE INVENTION

Many communication devices are mobile and operate on battery power. Such communication devices generally include a radio receiver and/or radio transmitter for radio communication, a user interface for controlling the communication device, and a rechargeable battery for powering the communication device.

An example of such a communication device is a radiotelephone handset. A radiotelephone handset includes a receiver and transmitter and operates in a radiotelephone system. The radiotelephone system includes one or more base stations coupled to the public switched telephone network (PSTN) and configured for completing calls between the radiotelephone handset and the PSTN. The radiotelephone handset, or mobile station, is portable and therefore free to move about within a fixed geographic area served by the base station. To improve mobility and user convenience, many radiotelephone handsets are powered by rechargeable batteries.

One design goal for communication devices including radiotelephone handsets is minimization of power consumption from the battery. One reason for this goal is to permit the use of physically smaller, lighter batteries. Such smaller and lighter batteries permit the communication, device itself to be physically smaller and lighter, and thereby more convenient for the user. A second reason for minimizing power consumption in a communication device is to extend the operating time of the communication device, which also enhances convenience for the user.

Battery power is consumed in a radiotelephone handset during both talk time and during idle time. Battery power is primarily consumed by the radio receiver and transmitter circuits, which consume relatively large amounts of power during radio operation. During talk time, the handset is in radio communication with the base station and is alternately receiving and transmitting. Both the receiver and the transmitter are powered on during talk time. However, for many users, talk time represents only a relatively small portion of the time the user's handset is powered on.

Battery power is also consumed during idle time, even though the user is not actively using the handset to communicate. In order to detect an incoming call, the handset may be actively searching for a control signal broadcast by a base station or may be locked to such a control signal broadcast by a base station. If the handset is actively searching for a base, the handset will search periodically, powering on the receiver to detect signals intended for the handset on any of the control channels used by the base station. If the handset is locked to a base station, the handset will continue to power on periodically to search for signals broadcast by other base stations on any other control channel used in the system. Although the handset is not in active use, the radiotelephone handset continues to dissipate battery power during idle time in attempting to detect incoming radio signals. This is also true of receive-only communication devices, such as paging receivers.

Battery power is also consumed as the handset maintains location registration in the radiotelephone system. The handset must register its location with one or more base stations in the radiotelephone system. By registering with a base station, the handset provides an indication of its location in the system so that the system may automatically route calls to the handset. The handset monitors a signal quality parameter, such as received signal strength (RSSI), of signals received on all control channels from all base stations. When signal quality from a current base station degrades below quality from another base station, the handset registers with the new base station. To determine which base station is appropriate for registration, the handset consumes battery power during idle time.

Battery power is also consumed in a radiotelephone handset at times when it is very unlikely that the handset will be used. For example, many users routinely operate their handsets to send and receive calls only during the daytime. If the user does not power off the handset overnight, battery power will be consumed as the handset monitors RSSI and searches for incoming control signals. This reduces the battery power which is available during subsequent usage periods. This is also true of receive-only communication devices, such as paging receivers.

Accordingly, there is a need for a method for reducing battery power consumption in a battery-operated communication device, particularly during the idle time of the communication device.

BRIEF DESCRIPTION OF THE DRAWINGS

The features of the present invention which are believed to be novel are set forth with particularity in the appended claims. The invention, together with further objects and advantages thereof, may best be understood by making reference to the following description, taken in conjunction with the accompanying drawings, in the several figures of which like reference numerals identify identical elements, and wherein:

DETAILED DESCRIPTION OF THE PREFERRED EMBODIMENTS

Figure 1:
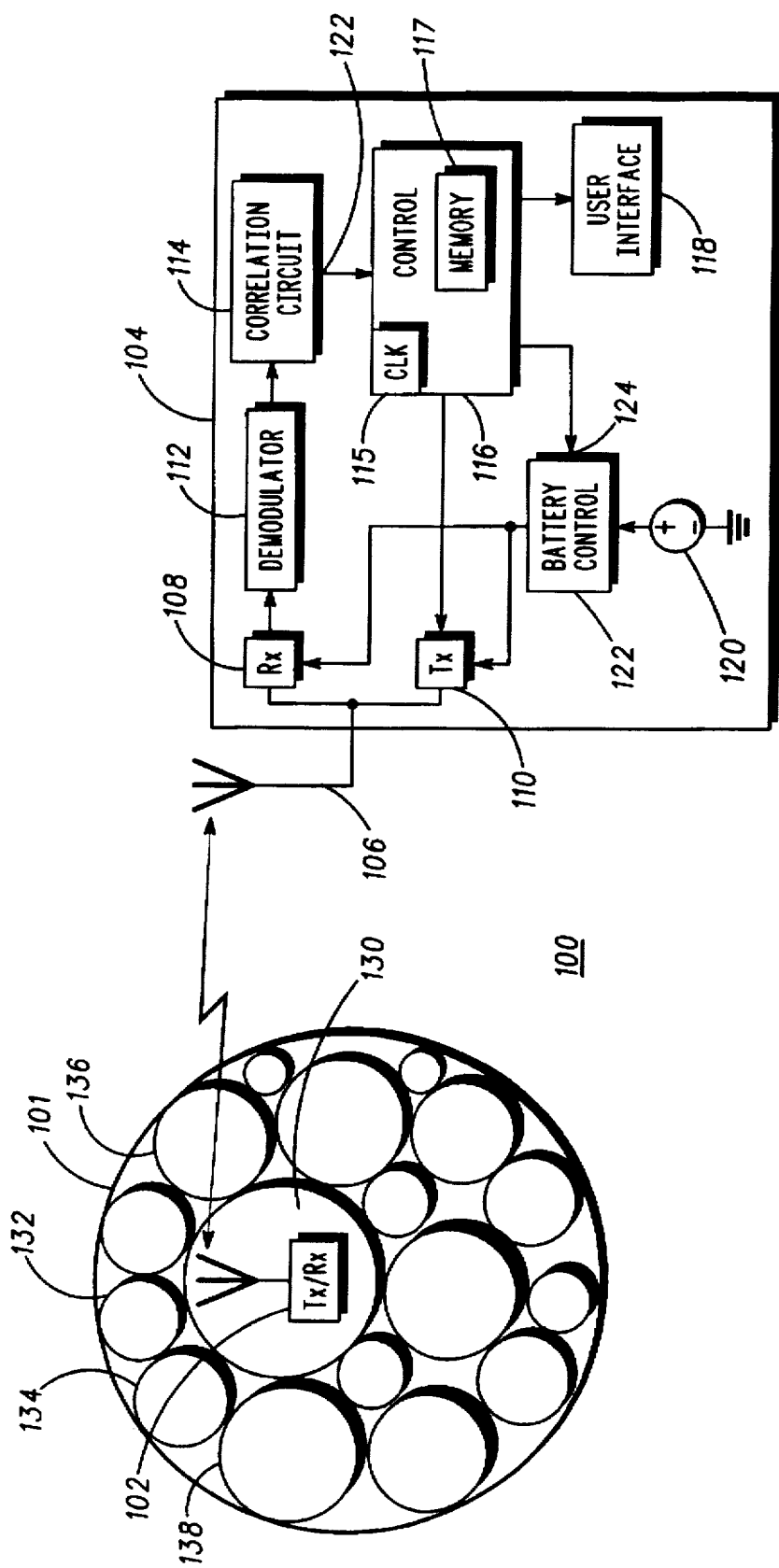
FIG. 1 is an illustration in block diagram form of a radiotelephone system.

FIG. 1 is an illustration in block diagram form of a radiotelephone system 100 including a base station 102 and a mobile station 104. The radiotelephone system 100 is configured to provide radiotelephone service to communications devices such as mobile station 104 located within a geographic area 101. As illustrated in FIG. 1, the geographic area served by the radiotelephone system 100 is generally round in shape, but may be any suitable shape, including square, triangular or hexagonal. The radiotelephone system 100 may be a cellular or cordless telephone system or trunked radio system or another similar communication system. For example, the radiotelephone system 100 may be a cordless radiotelephone system according to the Digital European Cordless Telecommunications (DECT) standard, or a cordless radiotelephone system according to the Japanese Personal Handy Phone System (PHS). Alternatively, the radiotelephone system 100 may provide paging service to communication devices such as mobile station 104 or to a paging receiver located within the geographic boundary of the radiotelephone system 100.

Radiotelephone system 100 includes a plurality of service areas such as service area 130, service area 132, service area 134, service area 136 and service area 138. Each service area defines a geographic area which is provided with radiotelephone service by an associated base station. For example, service area 130 is served by base station 102. Base stations which serve service area 132, service area 134, service area 136, service area 138, respectively, are not illustrated in FIG. 1 so as not to unduly complicate the drawing figure. Each base station, such as base station 102, is configured for radio communication with one or more mobile stations such as mobile station 104 under control of a network controller.

Operation of one base station in the radiotelephone system 100 will be discussed using base station 102 as an example. However, it is to be understood that all base stations serving all service areas operate in substantially the same manner.

The base station 102 sends and receives radio frequency (RF) signals to and from mobile stations within a fixed geographic area defined by the service area in which the base station 102 is located. The RF signals include voice information and/or digital data transmitted serially and modulated by a carrier frequency. The RF signals further include a plurality of control channels for conveying control information for communication between the mobile station 104 and the base station 102. There may be a large number of available control channels. For example, in a PHS system, there may be 77 control channels. Some control channels are broadcast by the base station and contain predetermined information, such as base station identity and capabilities. Such broadcast control channels may be received and read by any suitable communication device located in the service area or in nearby service areas.

Communication is initiated using control channels. For an incoming call (from the perspective of the mobile station 104), the base station 102 sends an appropriate signal on a control channel for detection by the mobile station 104. For an outgoing call, the mobile station 104 detects the presence of a control channel and in response signals the base station 102. Radio communication between the base station 102 and communication devices such as mobile station 104 is maintained according to a predetermined protocol.

The mobile station 104 may comprise a mobile radiotelephone mounted in an automobile or other vehicle or a portable radiotelephone which may be carried by a user. Further, the mobile station 104 may comprise a paging receiver or other portable communication device. The mobile station 104 may be transported and operated anywhere in the geographic area served by the base station 102. Also, the mobile station 104 may be transported and operated outside the service area 130 served by the base station 102, in areas served by other base stations similar to base station 102.

The mobile station 104 includes an antenna 106, a tunable receiver 108, a transmitter 110, a demodulator 112, a correlation circuit 114, a controller 116, a user interface 118, a battery 120 and a battery control 122. Upon reception of RF signals, the mobile station 104 receives the RF signals through the antenna 106. The antenna 106 detects the received RF signals. The tunable receiver 108 is coupled to the antenna and converts the RF signals into baseband signals. The channel or frequency at which the tunable receiver receives signals is controlled by the controller 116. The demodulator 112 is coupled to the receiver 108. The demodulator 112 demodulates the baseband signals, and provides the data to the correlation circuit 114. The correlation circuit 114 correlates the digital data and recovers the data transmitted on the RF signals. The correlation circuit 114 provides the recovered data to the controller 116.

In response to data received from the correlation circuit 114, the controller 116 formats the data into recognizable voice or information for use by user interface 118. The user interface 118 communicates the received information or voice to a user. Typically, the user interface 118 includes a display, a keypad, a speaker and a microphone.

Upon transmission of radio frequency signals from the mobile station 104 to the base station 102, the user interface 118 transmits user input data to the controller 116. The controller 116 formats the information obtained from the user interface 118 and transmits it to the transmitter 110 for conversion into RF modulated signals. The transmitter 110 conveys the RF modulated signals to the antenna 106 for transmission to the base station 102.

The mobile station 104 may include other operational elements suitable for operation in various communication systems. Similarly, the mobile station may not include all operational elements illustrated in FIG. 2 which are not necessary for use in a particular communication system. For example, if the mobile station 104 is a paging receiver, the mobile station 104 will not include the transmitter 110 and associated elements.

The controller 116 preferably comprises a microprocessor or microcontroller for controlling the operation of the mobile station 104. The controller 116 includes a memory 117 for storing data and instructions and a clock 115 for tracking time and establishing clocking signals for use by the mobile station 104. The controller 116 operates in response to a predetermined program of instructions stored in the memory 117. Moreover, the controller 116 receives control information from elements of the mobile station 104. For example, the controller receives a received signal strength indication (RSSI) from the receiver 108. Further operation of the controller 116 in accordance with the present invention will be described below.

Power for the mobile station 104 is provided by the battery 120. The battery 120 is preferably a removable, rechargeable battery, such as a nickel-metal-hydride battery, a lithium ion battery or other similar energy storage device. Preferably, the battery 120 is designed to be physically small and lightweight while storing substantial useable energy to provide a maximum operating time for the mobile station 104 before requiring recharge. The operating time before recharge of the battery is required is the battery life. Further, the battery 120 is preferably designed to be located in a module or other housing which is detachably joined with the other elements of the mobile station 104 in a single handheld unit to provide a radiotelephone handset or other communication device which maximizes user convenience. The mobile station 104 includes an on-off switch for completely powering down or turning off the mobile station.

The battery control 122 operates as a switch for decoupling the battery from predetermined portions of the mobile station 104. As is illustrated in FIG. 1, the battery control 122 is coupled to the transmitter 110 and the receiver 108 for selectively removing battery power from the transmitter 110 and the receiver 108. The battery control 122 may also be coupled to other portions of the mobile station 104. The battery control 122 has a control input 124 coupled to the controller 116. In response to a control signal received at the control input, the battery control 122 removes or applies battery power to portions of the mobile station 104. The battery control 122 may be implemented by a switch or by any other suitable device. Alternatively, the battery control may comprise a plurality of individual switches for decoupling circuit portions from the battery 120, each switch individually controllable by the controller 116. Some individual connections among the elements of the mobile station 104 are omitted in FIG. 1 so as to not unduly complicate the figure.

To further enhance user convenience, the method and apparatus according to the present invention operate to reduce consumption of energy stored in the battery 120 by powering down or removing power from elements of the mobile station when those elements are not in use. Moreover, the method and apparatus according to the present invention operate to extend battery life by predicting user location, mobility and action. There are three main processes which may be combined to reduce power consumption. One of the processes predicts user location. A second process predicts user movement. A third process predicts when the user needs to communicate.

Predicting user location allows the mobile station 104 to only search for control channels broadcast by base stations in the locations where the user and the mobile station 104 will be present. Since not all control channels are broadcast by all base stations, if the mobile station 104 can determine which control channels are in use, the mobile station can reduce the time during which the receiver 108 must be powered up, drawing power from the battery 120. For example, in a PHS system, the mobile station 104 can reduce battery consumption by only searching for predicted control channels, rather than all 77 control channels. In accordance with the present invention, the mobile station 104 maintains a historical record of past base station communications and associated times when a control channel from a particular base station was detected. The mobile station 104 will search for a base station more frequently around the time and on the channels where the base was previously found and less frequently otherwise. When not searching, the mobile station 104 will remain in a low-power sleep mode.

Predicting user movement allows the mobile station 104 to eliminate unnecessary registration to other base stations when the mobile station 104 is already locked to a base station. In accordance with the present invention, the mobile station monitors the control channel of the base station it is locked to and the surrounding base stations' control channels. The received signal strength (RSSI) for each base is detected and stored. The algorithm uses a weighted table of signal strength samples collected for base stations detected by the mobile station 104 to determine user movement. The mobile station generally remains in a low-power sleep mode, wherein elements such as the receiver 108 and the transmitter 110 are powered down to conserve energy stored in the battery 120. After a predetermined time period, such as 1.5 seconds, the handset periodically changes from the sleep mode to an active mode by powering up the receiver 108 and associated circuitry. If the signal strength of the control signal broadcast by the base station the mobile station 104 is locked to is below an acceptable level, the mobile station 104 scans the control channels recommended by the algorithm that predicts user location. If the expected base is not found, then every other time the mobile station wakes up, all the control channels are scanned. As the mobile station moves, establishing communication and registering with various base stations, the mobile station collects a history of the signal strength the base is locked to and surrounding bases. In this manner, the mobile station 104 can determine if the user and mobile station 104 are moving away from the base the mobile station is locked to (the current best base) and toward an adjacent base (or potential best base). Average signal strengths from the two bases are used to determine if the user is moving.

Predicting when the user needs to communicate allows the mobile station to enter a very low power mode or continuous sleep mode. In the continuous sleep mode, in distinction to the sleep mode, the mobile station 104 does not wake up periodically (for example, every few seconds) to detect a control channel. Rather, the mobile station in continuous sleep mode remains largely powered down (but not turned off) for an extended period of time. When the extended period of time elapses, the mobile station again powers up to search for a control channel.

Referring now to FIGS. 2–7, they show a flow diagram illustrating operation of a communication device such as mobile station 104 in accordance with the method of the present invention and in conjunction with the radiotelephone system 100 of FIG. 1. The steps of the method may be implemented by elements of the mobile station 104 including the receiver 108 and the controller 116. Alternatively, the method could be used in a system including a pager or paging receiver or any other portable, battery power communication device.

The method begins at step 202 by initializing operational features of the mobile station 104. At step 202, a control activity table and a call activity table are both cleared. Preferably, the control activity table is maintained in the memory 117 (FIG. 1) and contains a record of past communication activity including a record of detected control channel frequencies and the times when control channels were located by the mobile station 104. Similarly, the call activity table is located in the memory 117 and contains a record of past communication activity including a plurality of communication actions and associated communication times. This includes, for example, the starting time and duration for all outgoing and incoming calls by the mobile station 104.

At step 204, a control channel search period is reset to a predetermined value, such as 1.5 seconds and a 24-hour timer is started. A days count is also reset to 0. The control channel search period, the 24-hour timer and the days count are preferably maintained by the controller 116 in the memory 117 in response to timing signals produced by the clock 115. The control channel search period is the time between consecutive attempts by the mobile station 104 to locate a control channel broadcast by a base station.

Figure 2:
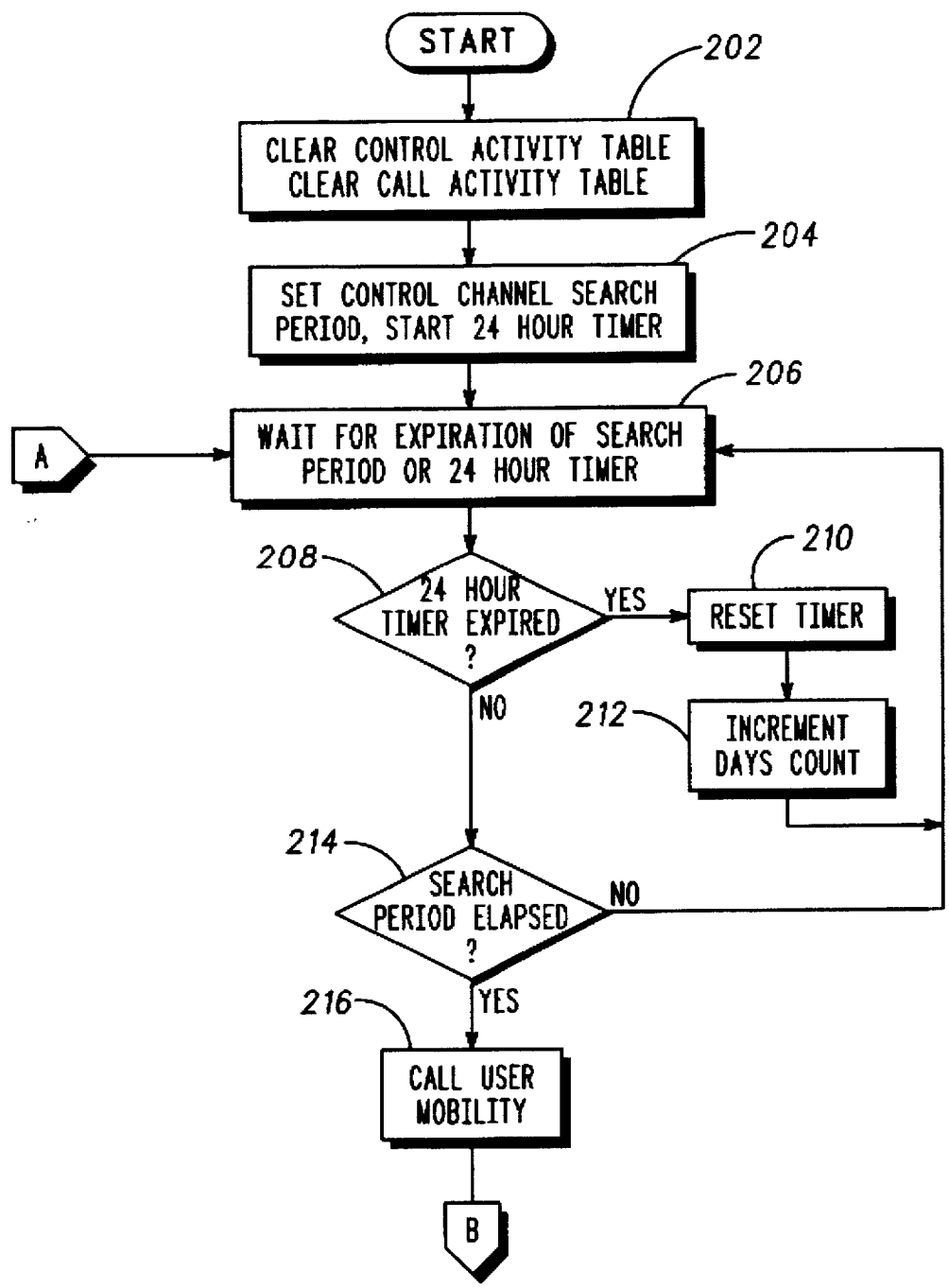
FIGS. 2, 3A, 3B and 4–7 are a flow diagram illustrating operation of a radiotelephone handset in accordance with the method of the present invention and in conjunction with the radiotelephone system of FIG. 1.
Figure 3A:
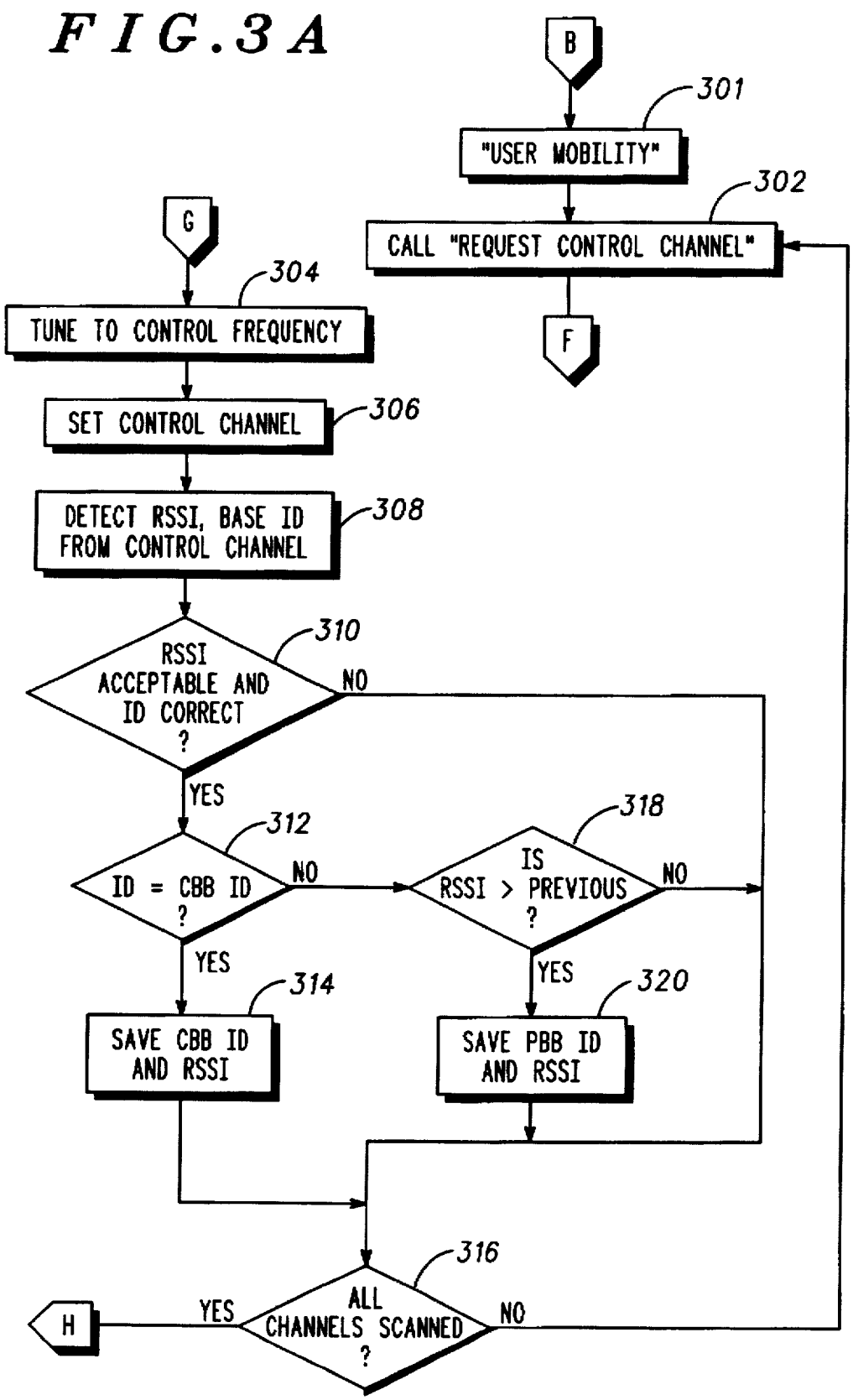

The remainder of the steps illustrated in the flow diagram of FIGS. 2, 3A, 3B and 4–7 are repeatedly executed by the controller 116 to determine which action should be taken by the mobile station 104 in response to changing conditions. As a changed condition or input state is detected, one or more subroutines is called by the controller 116 for additional processing. At step 206, the method waits for expiration of either the search period or the 24 hour timer. At step 208, the method determines whether the 24 hour time has elapsed. If the 24-hour timer has expired, at step 210 the 24-hour timer is reset and at step 212 the days count is incremented by one. Control then returns to step 206. If at step 208 the 24 hour timer had not yet expired, at step 214 the method determines if the search period has elapsed. If not, control returns to step 206. If the search period has elapsed, at step 216, a "user mobility" process is called and execution continues at step 301 (FIG. 3A).

Referring now to FIG. 3A, the user mobility process is illustrated, beginning at step 301. The user mobility process uses received signal quality information, such as a received signal strength indication (RSSI), to identify a "current best base" or CBB. The CBB is the base station which currently provides the best signal quality and to which the mobile station 104 is currently locked. Further, the user mobility process uses the signal quality information to identify one or more "potential best bases" or PBB. A PBB is a base station which is a candidate to become the CBB. During the predetermined repeat duration, the user mobility process stores in the control activity table in memory 117 a record of all detected base station identifiers and RSSI values along with associated communication times. In the portion of the user mobility process illustrated in FIG. 3A, the mobile station 104 collects an ongoing history of signal strength of the base stations the mobile station has locked to and the surrounding base stations with acceptable signal strength. This is done to determine if the mobile station 104 is moving away from the base station the mobile station is locked to (the current best base or CBB) and towards a surrounding base station (the potential best base station or PBB). Initially in FIG. 3A, the user mobility process calls a "request control channel" process at step 302, and execution continues at step 401 (FIG. 4).

Figure 4:
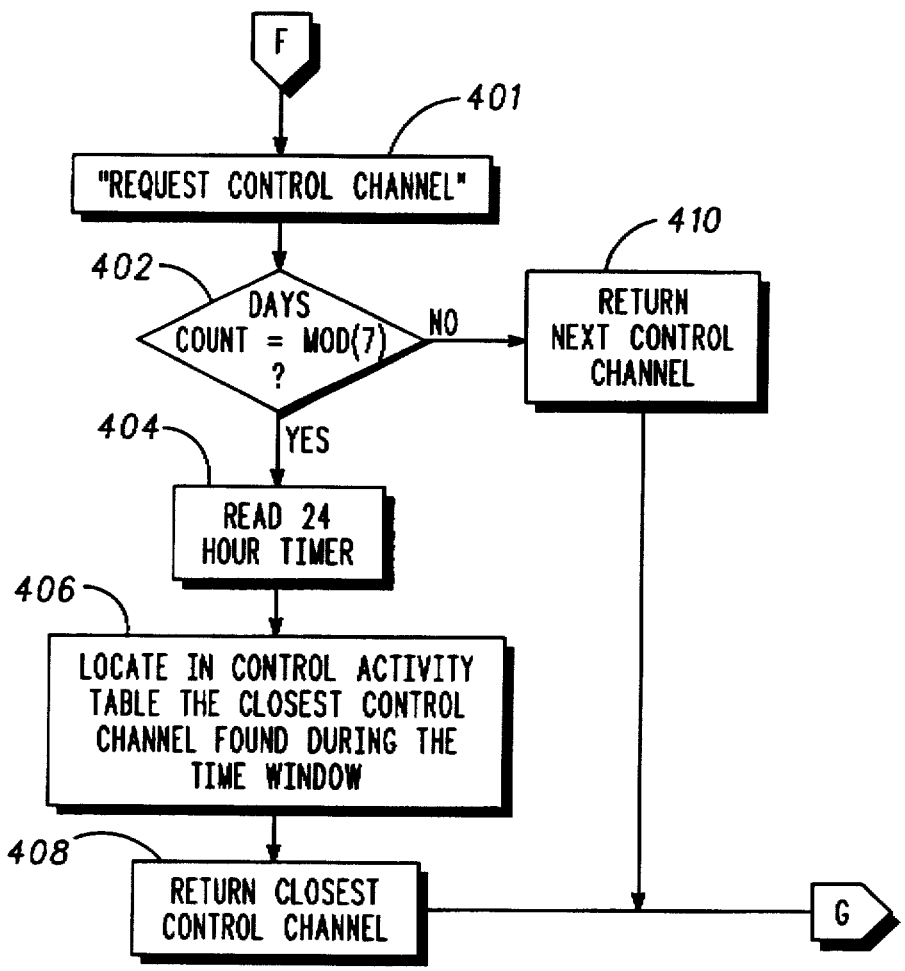

Referring to FIG. 4, the request control channel process, step 401, is illustrated. This process is used for selecting a control channel to scan for incoming information transmitted by a base station. The selection is based upon the previously recorded control channel activity recorded in the control activity table in the memory 117 (FIG. 1). It is presumed that the user of the mobile station 104 operates the mobile station 104 in a generally periodic fashion. For example, many users generally follow a seven-day or one week schedule, working five days and enjoying a two-day weekend. The five working days similarly follow a periodic schedule, including time at home, time traveling to work, time at a work site, and again, time at home. As the user follows this periodic schedule, transporting the mobile station 104 with the user, the mobile station 104 travels through the same service areas at approximately the same times of each day and during the same days of each week. As the mobile station 104 repeatedly travels through the same service areas, the mobile station 104 detects and stores control channels broadcast by the same base stations at about the same time every day. Thus, during a predetermined repeat duration, the detected control channels and the times of detection are stored in the control activity table maintained in the memory 117. During a subsequent repeat duration, the controller 116 (FIG. 1) provides battery power to portions of the mobile station 104 at times corresponding to times stored during previous repeat durations. Preferably, the predetermined repeat duration is one week or seven days.

At step 402, it is determined if the days count is equal to modulo seven. The days count is maintained in the memory 117 and seven corresponds to the number of days in a week. If the user of the mobile station 104 followed a routine having a different periodicity, the days count could be compared with any other number besides seven. If the days count equals modulo seven, a full week has elapsed and, at step 404, the 24-hour timer is read to determine the time of the current day. At step 406, the control activity table maintained in the memory 117 is read to locate the control channel found during the current time window surrounding the current time which was read from the 24-hour timer. Time windows may be defined in any convenient fashion, including each time window having a duration of one hour, each time window being defined by initiation of an incoming or outgoing call, or each time window being defined by detection of a control channel by the mobile station 104. At step 408, the located control channel is returned and control resumes at step 304 (FIG. 3A). If, at step 402, the days count was not equal to modulo seven, indicating that other than a full week has elapsed, the request control channel process simply returns the next control channel and processing continues at step 304 (FIG. 3A).

Referring again to FIG. 3A, at step 304 the mobile station 104 selects the control frequency returned by the request control channel process, FIG. 4. That is, the controller 116 provides a control signal to the control input 124 of the battery control 122 (FIG. 1), causing the battery control 122 to couple the receiver 108 to the battery 120, thereby powering up the receiver 108. In response to the controller 116, the receiver 108 tunes to the frequency corresponding to the control channel returned by the request control channel process (FIG. 4). At step 306, the mobile station 104 searches for the control channel returned by the request control channel process and, at step 308, the mobile station 104 detects the received signal strength (RSSI) and the identification of the base station transmitting the control channel. At step 310, it is determined if the RSSI value is acceptable, and if the base identification is correct. If not, control continues at step 316. If the RSSI was acceptable and the base ID correct, at step 312, it is determined if the base identifier corresponds to the current best base identifier (CBB ID). The CBB ID is stored in the memory 117 and corresponds to the identifier of the base station which has provided the strongest or best signal as measured by the RSSI value. If the received base identifier corresponds to the CBB ID at step 314, the CBB ID and the measured RSSI value are saved in the control activity table in memory 117 and control continues at step 316. If, at step 312, the received base identifier does not correspond to the CBB ID, at step 318, the detected RSSI value is compared with the previously stored RSSI value for the CBB ID. If the new RSSI value does not exceed the previously stored value, control continues at step 316. If the detected RSSI value does exceed the previously stored CBB ID RSSI value, at step 320, the base identifier of the currently detected base station and its RSSI value are stored as a potential best base (PBB) and the base identifier is referred to as the PBB ID. Control then continues at step 316.

At step 316, it is determined if all channels have been scanned. If not, control returns to step 302 to request another control channel using the request control channel process. If all channels have been scanned, control continues at step 322, FIG. 3B.

Figure 3B:
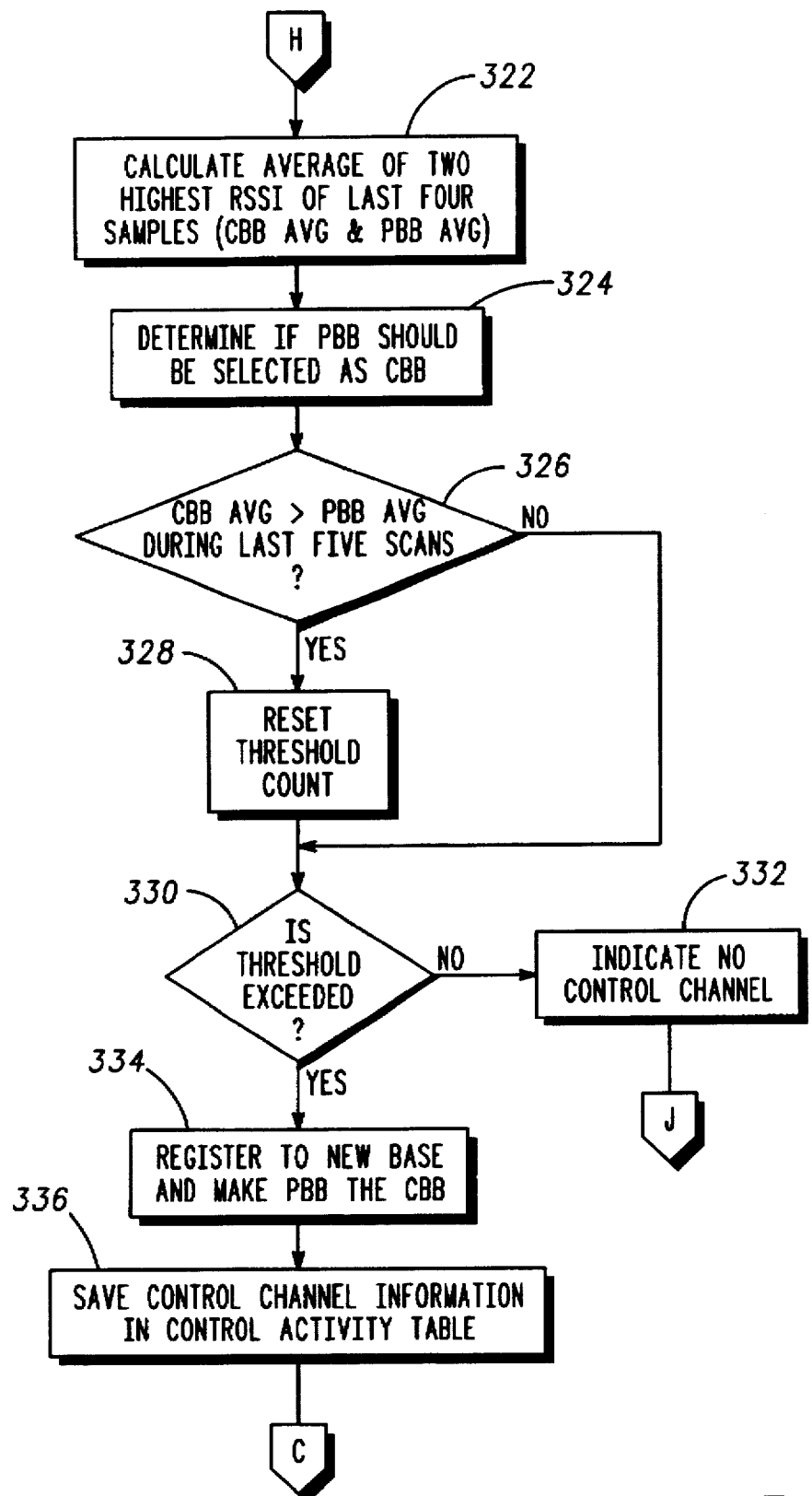

In the portion of the user mobility process illustrated in FIG. 3B, the mobile station 104 determines if registration to a new base station is appropriate. The mobile station 104 receives a first control channel transmitted by the current best base station and at least a second control channel, and locks to the first control channel. The mobile station 104 further determines RSSI values for each received control channel. In response to the RSSI values, the mobile station 104 determines if the mobile station 104 is moving away from the current best base and toward the potential best base. The mobile station 104 calculates the average of the two highest signal strengths in the last four samples. These two averages are then used to determine if the user and the mobile station are in fact moving. The difference in RSSI value between the two average values is compared against a predefined table. The table contains ΔRSSI values and weighted counts. The greater the ΔRSSI value, the greater the associated count. These counts are used to implement a re-registration counter. Once the re-registration counter reaches a predefined threshold level, the base station with the highest RSSI in the PBB table is selected for registration.

Thus, at step 322 the mobile station 104 calculates the average of the two highest RSSI values from the last four detected samples to produce values identified as CBB AVG and PBB AVG. At step 324, it is determined if the potential best base (PBB) should be selected as the current best base (CBB). This determination is made using the weighted counts in the ΔRSSI table and the threshold. The two average values, CBB AVG and PBB AVG, are used to determine if the mobile station is actually moving. The change in RSSI between the CBB RSSI and the PBB RSSI is calculated according to the following relation:

$$\Delta RSSI = PBB\ RSSI - CBB\ RSSI$$

PBB RSSI is the potential best base station RSSI value; CBB RSSI is the current best base station RSSI value.

In step 324, the calculated ΔRSSI value is compared against a predefined ΔRSSI table containing ΔRSSI values and weighted counts to obtain a re-registration count. Typical values which may be used for the table are as follows:

| ΔRSSI | Increment Threshold Count by |
|---|---|
| 0–3 dB | 0 |
| 3–10 dB | 1 |
| 10–20 dB | 2 |
| 20–30 dB | 4 |
| >30 dB | 5 |

The listed values are included only for exemplary purposes. Other values for the table may be used as appropriate.

The counts are used to increment a re-registration counter which is maintained in memory 117 by the controller 116. Once the controller 116 determines that the re-registration counter has reached a predetermined threshold level, the base station having the highest RSSI value in the PBB table is selected for registration.

Figure 7:
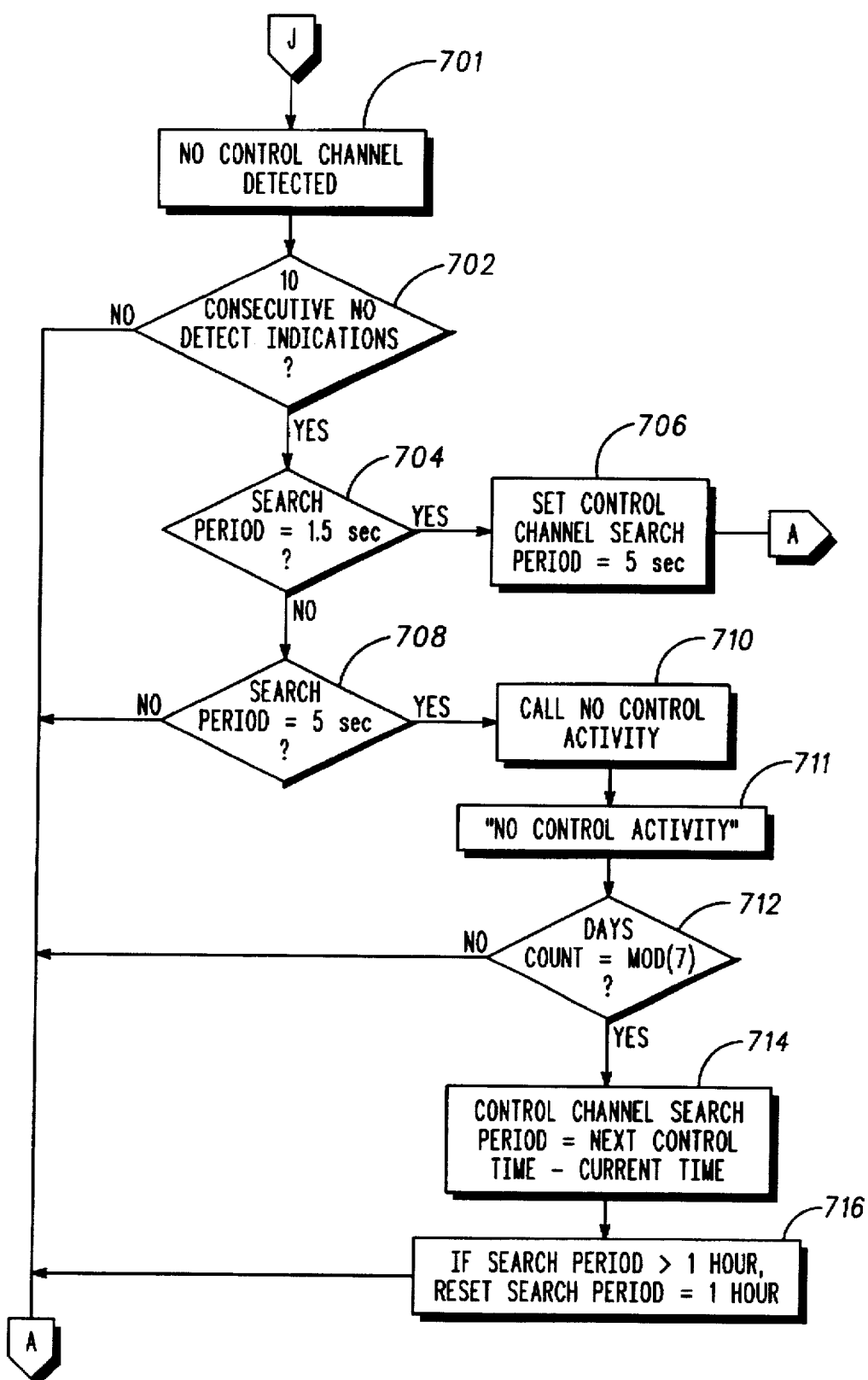

To avoid scenarios in which the mobile station 104 continuously re-registers with a newly identified base station, the re-registration counter is preferably cleared whenever the base station the mobile station 104 is locked to is found to be the station with the highest average RSSI during two out of the last five times a search was done for a control channel broadcast by a base. Thus, at step 326, the mobile station 104 checks for this condition by comparing CBB AVG and PBB AVG for the last five scans. If this condition is true, at step 328 the mobile station 104 resets the threshold count. After the reset, and if the reset was not necessary, execution continues at step 330. At step 330, the mobile station 104 determines if the re-registration counter has reached the predetermined threshold level. If not, at step 332, the controller 116 determines that no control channel has been detected and execution continues at step 701 (FIG. 7). If the threshold level was exceeded at step 330, at step 334, the mobile station 104 registers with the base station with the highest RSSI value in the PBB table and the PBB becomes the CBB. At step 336, the control channel information, including the frequency and the time when the control channel is found, are saved in the control activity table in the memory 117.

Figure 5:
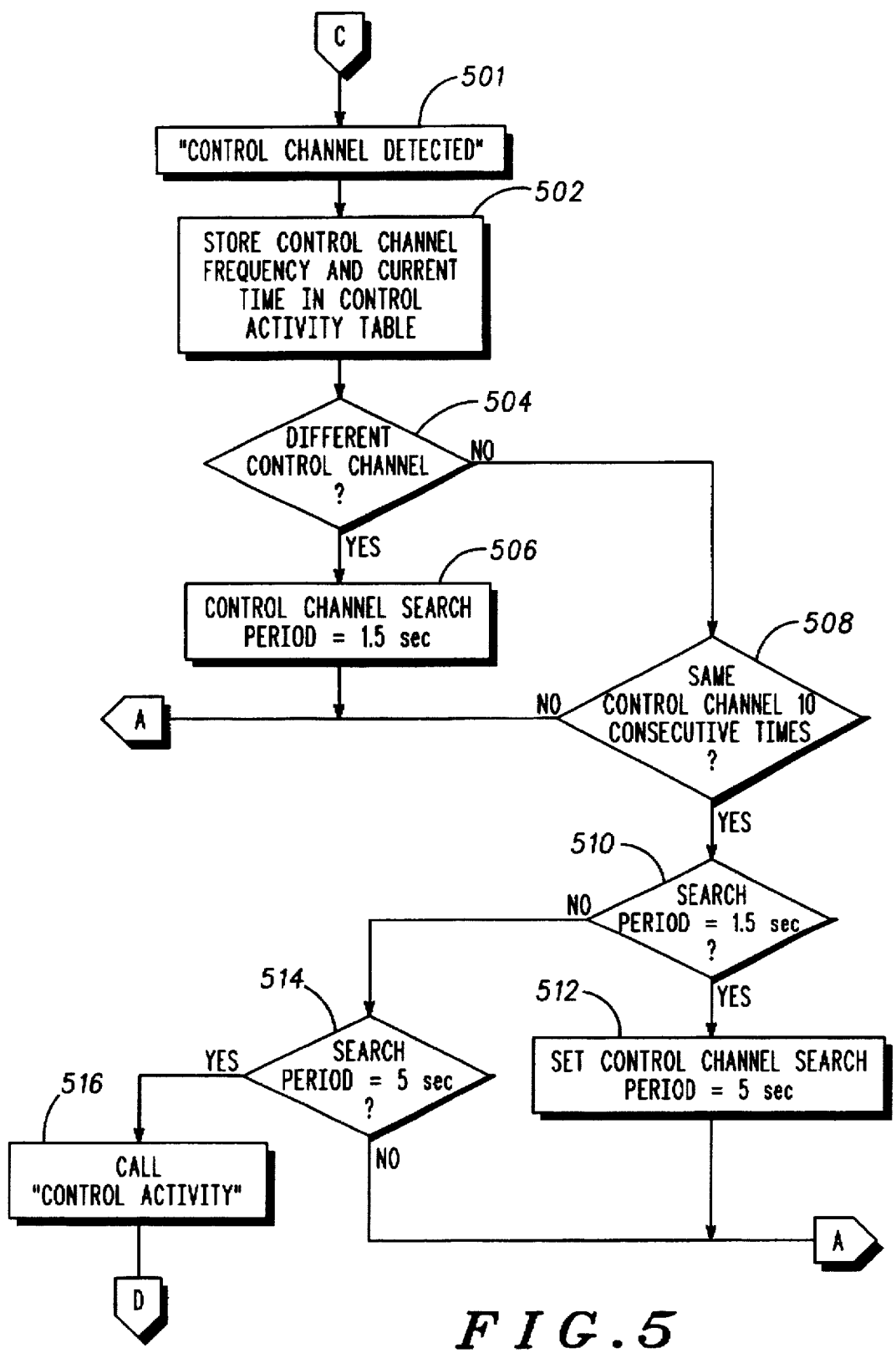

Thus, in the user mobility process, the mobile station 104 has searched for base stations which were previously detected and stored in the control activity table. This reduces power consumption compared to searching for all possible base stations. Using the stored information in the control activity table, the mobile station 104 eliminates unnecessary registrations when the mobile station 104 is already locked to a base station, thereby further reducing power consumption. Thereafter, control continues at step 501 (FIG. 5).

Step 501 begins the "control channel detected" process. The control channel detected process adjusts the control channel search period appropriately to minimize power consumption while ensuring the mobile station 104 accurately detects all control channels. At the end of each search period (step 206, FIG. 2), the receiver 108 (FIG. 1) is powered on to search for control channels, thereby dissipating power. If a new control channel is detected, different from the one to which the mobile station 104 is currently locked, the search period is set to a relatively short duration, such as 1.5 seconds. This suggests that the mobile station 104 has moved to a location where different control channels are used and control channels should be scanned more frequently for accurate operation, even at the expense of added power dissipation from the battery 120 (FIG. 1). When the same control channel has been detected a number of consecutive times, the control channel search period is increased, for example to 5 seconds. This suggests the mobile station 104 is stationary and the mobile station 104 can conserve power by searching less frequently. When the control channel is detected a number of consecutive times using the increased search period, this further suggests that the mobile station is stationary and the mobile station may enter a low-power sleep mode for an extended sleep time.

At step 502, the frequency corresponding to the detected control channel, along with the current time read from the 24-hour timer, are stored in the control activity table in the memory 117. At step 504, the controller 116 determines if the detected control channel is different from the control channel to which the mobile station 104 is currently locked. If it is a different control channel, this suggests the mobile station is moving, so at step 506 the control channel search period is set to a relatively short period such as 1.5 seconds. Control returns to step 206 (FIG. 2). If the detected control channel is not different from the currently locked control channel, at step 508 the controller 116 determines if the same control channel has been detected ten consecutive times. If not, control resumes at step 206 (FIG. 2). If the same control channel was detected ten consecutive times, or any other appropriate number of times, at step 510 it is determined if the search period is currently set at 1.5 seconds. If so, at step 512 the control channel search period is set to 5 seconds and control resumes at step 206 (FIG. 2). If, at step 510, the current search period was not 1.5 seconds, at step 514 it is determined if the current search period is set at 5 seconds. If not, control resumes at step 208 (FIG. 2). If, at step 514 the search period is set at 5 seconds, at step 516 the control activity process, step 601 (FIG. 6) is called and control proceeds to step 601.

Figure 6:
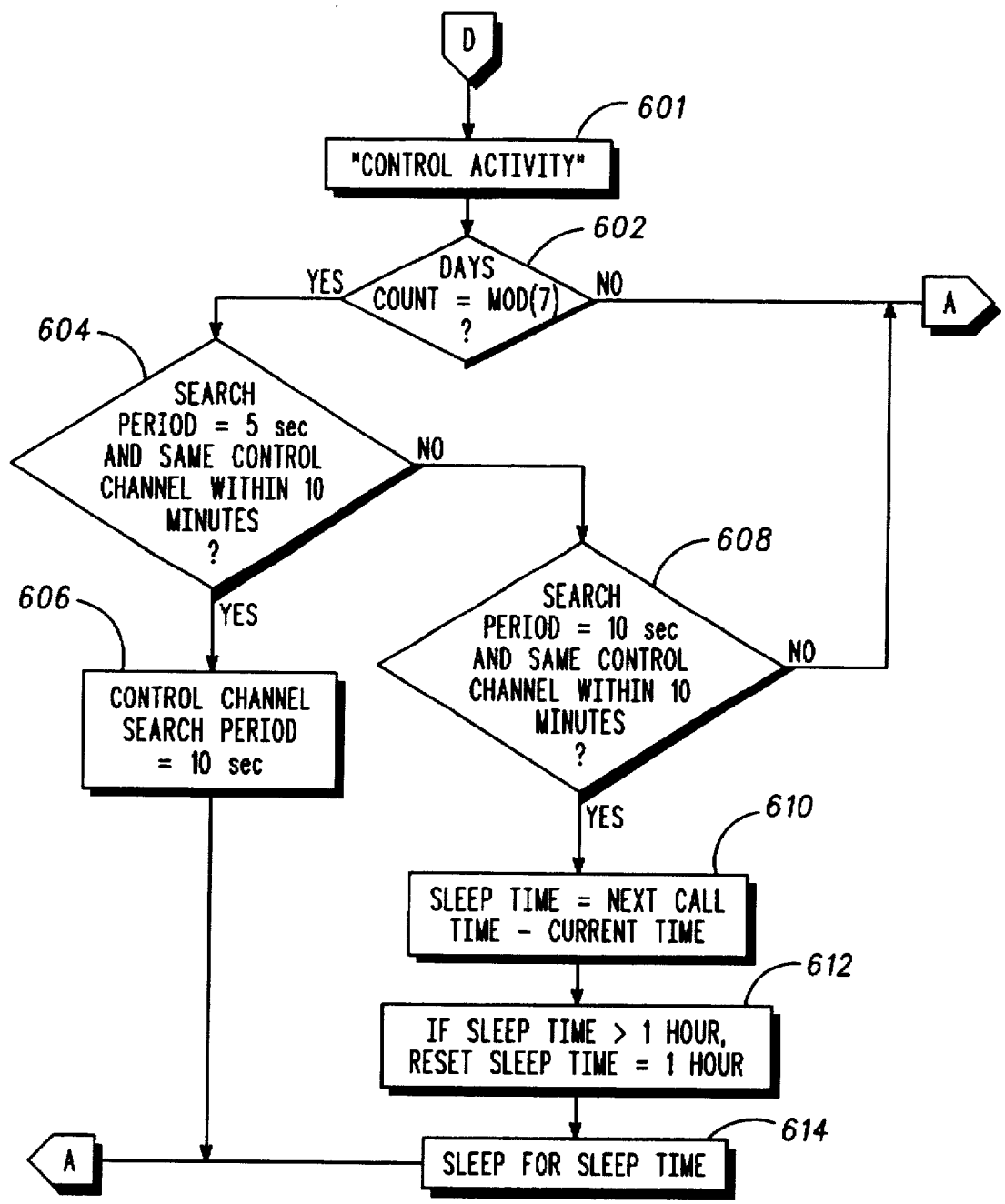

The control activity process illustrated in FIG. 6 is used for determining how long the mobile station 104 should stay in a low power sleep mode when the mobile station 104 is currently locked to a base station such as base station 102. At step 602, it is determined if the days count equals modulo seven, i.e. corresponding to lapse of a full week. If not, control returns to step 206 (FIG. 2). If so, at step 604 it is determined if the search period is currently set equal to five seconds and if the same control channel has been detected within the last ten minutes. This determination is made using the information stored in the control activity table in memory 117. If both of these conditions are true, at step 606, the control channel search period is set to ten seconds and control resumes at step 206 (FIG. 2).

If either the search period was other than five seconds or the same control channel was not detected within the last ten minutes, at step 608 it is determined if the search period is currently set equal to ten seconds and the same control channel was detected within the last ten minutes. Again, this determination is made using information stored in the control activity table in memory 117. If both these conditions are not true, control returns to step 206 (FIG. 2). However, if both conditions are true, at step 610, a sleep time is calculated.

The sleep time corresponds to the duration of the period during which the mobile station 104 enters a low-power sleep mode. The sleep time is set equal to the difference between the next call time and the current time. The next call time is determined by predicting from the data stored in the call activity table when the next call is likely to be made by the user. At step 612, if the calculated sleep time exceeds an hour, the sleep time will be reset to a maximum of one hour.

At step 614, mobile station 104 enters the low power sleep mode for the duration of the calculated sleep time. The controller 116 provides a control signal to the control input 124 of the battery control 122 (FIG. 1), causing the battery control 122 to decouple the receiver 108 and the transmitter 110 from the battery 120, thereby reducing power consumption of the mobile station 104. Control then returns to step 206 (FIG. 2).

If, at step 332 (FIG. 3B), the controller 116 determined that no control channel was detected, execution continues at step 701 (FIG. 7), which begins the "no control channel detected" process. At step 702, it is determined if there have been seven consecutive no detect indications, where no control channel was detected. If not, control returns to step 206 (FIG. 2). If so, at step 704, it is determined if the search period is currently set at 1.5 seconds. If so, the control channel search period is increased to 5 seconds and control returns to step 206 (FIG. 2).

If, at step 704, the search period was not set at 1.5 seconds, at step 708 it is determined if the search period is currently set at 5 seconds. If not, control returns to step 206 (FIG. 2). If so, the "no control activity" process, step 711, is called. In the no control activity process, the duration of the control channel search period is calculated for the situation where the mobile station is not currently detecting a control channel. At step 712, it is determined if the days count equals modulo seven, i.e., corresponding to lapse of a full week. If the days count does not equal modulo seven, control returns to step 206 (FIG. 2).

If at step 712 the days count does equal modulo seven, at step 714 the control channel search period is set equal to the difference between the next control time and the current time. The current time is determined by reading the 24-hour timer maintained by the controller 116. The next control time is determined from the data maintained in the control activity table in memory 117. The next control time corresponds to the next time following the current time when a control channel was detected. For example, if the current time is noon and yesterday a control channel was detected at 1:00 p.m., the next control time would be 1:00 p.m. At step 716, if the control channel search period exceeds one hour, the search period is reset to a maximum search period of one hour. Control then resumes at step 206 (FIG. 2).

An example will now be provided to illustrate operation of a mobile station according to the present invention to provide reduced battery power consumption. This example is illustrative of one operation of the mobile station and is not intended to be limiting in any way.

According to this example, a user of the mobile station initially has the mobile station at home. At 10 AM, the user leaves home and travels to a train station, taking the mobile station along. At 11 AM, the user arrives at work and uses the mobile station for communication, including taking the mobile station to the cafeteria at lunch time. At 7 PM, the user returns from work to home on the train. The following table illustrates the contents of the control activity table of the mobile station after this exemplary day. The table records the time of registration to a new current best base, an identifier for the base station and the control channel transmitted by the base station.

| 3:00 AM | Home base | channel 7 |
| 10:00 | Train Station base | channel 68 |
| 10:05 | Base A | channel 9 |
| 10:07 | Base 99 | channel 72 |
| 10:11 | Base C8 | channel 13 |
| 10:20 | Base FF | channel 59 |
| ... | ... | |
| 10:55 | Base 19 | channel 4 |
| 11:00 | Train depot base | channel 75 |
| 11:10 | Office base | channel 59 |
| 2:05 PM | Cafeteria base | channel 14 |
| 2:40 | Office base | channel 59 |
| 7:05 | Train depot base | channel 75 |
| 7:10 | Base 19 | channel 4 |
| ... | ... | |
| 8:00 | Train station base | channel 68 |
| 8:10 | Home base | channel 7 |

Initially, at 3:00 AM, the mobile station is registered to the user's home base station. At 10:00 AM, as the user arrives at the train station, the mobile station registers to a public base station at the train station. As the user and mobile station travel on the train, the control activity table records a flurry of activity as the mobile station registers with public base stations along the train's route. At 11:00, upon arriving at the train depot near the user's job site, the mobile station registers with the train depot base station. At 11:10, the user arrives at his office and the mobile station registers with his office base station. At 2:05, the user carries the mobile station to the cafeteria during lunch and the mobile station registers with the base station serving the cafeteria. Subsequently, the mobile station registers again with the office base station. At 7:00, after work, the user travels again to the train depot and the mobile station again registers with the base station there. On the trip home, there is another flurry of recorded activity as the mobile station registers with base stations along the route. The mobile station then registers with the train station base and finally with the user's home base.

At each registration with a new base station, the operation of the mobile station proceeds through the user mobility process, FIGS. 3A–3B. The mobile station registers to a new base station only after identifying it as a potential best base (step 320), then selecting the potential best base as the current best base (step 334).

After storing the data listed above in the control activity table, the mobile station has established a history of activity which may be used to reduce registration activity and thus reduce consumption of battery power. On a subsequent day, if the user's activity follows a similar schedule, the mobile station operated according to the present invention may reduce power during times when no control activity is expected, based on the record maintained in the control activity table.

The mobile station reduces battery power consumption by increasing the channel search period during times when the control activity table indicates control activity is less likely.

Stated alternatively, the mobile station decreases the frequency at which it searches for control channels during such times. As an example using the control activity table data above, during the time from 3 AM to 10 AM, the control activity table records no registrations or other control activity. Similarly, when the user is in his office or in the cafeteria, few registrations are recorded. Detecting this, the mobile station increases the control channel search period during these times. For example, the control channel search period is increased from 1.5 seconds to 5 seconds to 10 seconds (FIG. 5, FIG. 6). The mobile station may even enter a low power sleep mode for a predetermined sleep time (step 614). Other than when searching for a control channel, the power to the receiver 108 and the transmitter 110 is cut off, saving battery power. By powering the receiver 108 only during the occasional search periods, battery power consumption is greatly reduced.

The mobile station also conserves battery power by reducing the number of control channels searched for control channel activity, based on the record of control channel activity stored in the control activity table. Each base station uses only a few control channels out of the total possible number of control channels defined in a system. For example, in a PHS system, up to 77 control channels are defined, only a few of which are used by any given base station. When the mobile station according to the present invention exits sleep mode or otherwise attempts to initiate communication with a base station, the mobile station determines the current time, locates in the control activity table the closest control channel previously found at that time (step 406, FIG. 4) and attempts to initiate communication using that control channel. The control activity table may include several control channels for that base at that time, and each control channel will be tested for acceptable RSSI and base identification. In this manner, the mobile station only has to detect one or a few control channels, rather than scanning, for example, all 77 control channels, to identify the best channel. The mobile station thus only has to power on the receiver 108 for as long as is required to detect the one or few control channels, not for the entire scan time. By powering the receiver 108 on only for a brief channel detect time, battery power consumption is greatly reduced.

The table above is useful for days when the user follows a similar workday schedule. On weekends, when the user follows a different schedule, the control activity will record different information. Storing in the control activity table data for an entire week, or whatever period may be most appropriate, accommodates such variations in the user's schedule.

As can be seen from the foregoing, the present invention provides a method and apparatus for reducing power consumption in a portable communication device by predicting a user's location, movement and actions. A historical record of control channel activity is maintained in memory, along with a historical record of call activity. This data is used to determine when and where a call will be made. The permits the mobile station to enter a low-power sleep state to conserve battery power when no call activity is likely. The stored data is also used to predict what control channels should be scanned to search for a nearby base station. This permits the mobile station to scan fewer control channels and reduces the time necessary for powering up the receiver of the mobile station.

While a particular embodiment of the present invention has been shown and described, modification may be made. It is therefor intended in the appended claims to cover all such changes and modifications which fall within the true spirit and scope of the invention.

What is claimed is:

1. A method for reducing battery power consumption in a portable communication device which is configured for communication with one or more base stations on one or more control channels, the method comprising the steps of:

maintaining at the portable communication device a call activity table which includes a record of past communication activity by the portable communication device;

maintaining at the portable communication device a control activity table, the control activity table including a record of detected control channel frequencies, associated received signal strength indications (RSSI) and associated times;

in response to the control activity table, determining a best base and best control channel for establishing communication with the best base;

maintaining a current time at the portable communication device;

predicting, in response to the current time and the record of past communication activity, future communication activity by the portable communication device;

removing battery power from predetermined portions of the portable communication device during times when no future communication activity is predicted; and in response to the current time, providing battery power to the predetermined portions of the portable communication device only during a duration sufficient to detect communication from the best base on the best control channel.

2. A method for reducing power consumption in a portable communication device as recited in claim 1 wherein the record of past communication activity includes a plurality of communication actions and a plurality of associated communication times and wherein the predicting step comprises the steps of:

comparing the current time with at least some associated communication times; and when the current time matches a communication time, providing power to the predetermined portions of the portable communication device.

3. A method for reducing power consumption in a portable communication device as recited in claim 2 wherein the method further includes the steps of:

determining a sleep time corresponding to a difference between a next call time and the current time; and removing battery power from the predetermined portions of the portable communication device during the sleep time.

4. A method for reducing power consumption in a portable communication device as recited in claim 1 wherein the method further comprises the steps of:

during a predetermined repeat duration, storing a record of base stations with which the portable communication device has communicated and storing a record of associated communication times; and during a subsequent repeat duration, providing battery power to the predetermined portions of the portable communication device at times corresponding to the associated communication times.

5. A method for reducing power consumption in a portable communication device as recited in claim 4 wherein the predetermined repeat duration comprises one week.

6. A method for reducing power consumption in a portable communication device as defined in claim 1, wherein the method further comprises the steps of:

identifying a current best base (CBB) and a CBB received signal strength (CBB RSSI);

detecting a control channel transmitted by a potential best base (PBB) and determining a PBB RSSI;

in response to the CBB RSSI and the PBB RSSI, replacing the current best base with the potential best base when the potential best base provides improved signal quality; and registering with the potential best base.

7. A portable communication device configured for communication with one or more remote base stations using one or more control channels, the portable communication device comprising:

a battery for providing power to the portable communication device;

a switch for decoupling the battery from portions of the portable communication device;

a controller coupled to the switch for selectively controlling the switch, the controller including:

a clock for maintaining a current time; and a memory configured for storing a call activity table and a control activity table, the call activity table including a record of past communication activity by the portable communication device, the control activity table including a record of detected control channel frequencies, associated received signal strength indications and associated times, the controller predicting future communication activity by the portable communication device using the record of past communication activity and predicting future communication activity in response to the control activity table, the controller controlling the switch to decouple the battery from the portions of the portable communication device during times when the controller predicts no future communication activity.

8. A portable communication device as recited in claim 7, further comprising a tunable receiver coupled to the controller and wherein the controller tunes the tunable receiver to a control channel and determines a received signal strength and a base identifier in response to the control channel, the controller further selecting the remote base station corresponding to the base identifier as a current best base when the received signal strength exceeds a stored received signal strength.

9. A portable communication device as recited in claim 7 further comprising a tunable receiver coupled to the controller, the controller identifying predicted control channels in response to the call activity table, the controller tuning the tunable receiver to search for the predicted control channels more frequently at times corresponding to past communication activity.

10. A portable communication device as recited in claim 7 wherein the portable communication device comprises a radiotelephone.

11. A portable communication device as recited in claim 7 wherein the portable communication device comprises a paging receiver.

12. A method for reducing power consumption in a portable communication device, the portable communication device configured for communicating with one or more remote base stations which transmit a plurality of control channels, the method comprising the steps of:

receiving at the portable communication device a first control channel transmitted by a current best base station and at least a second control channel;

locking to the first control channel;

after locking to the first control channel, entering a low-power sleep mode;

periodically changing from the low-power sleep mode to an active mode;

determining a received signal strength indication (RSSI) value for each control channel;

in response to the RSSI values, determining if the portable communication device is moving away from the current best base station toward a potential best base station, including the steps of:

upon entering the active mode, storing data corresponding to each received control channel and an RSSI value corresponding to the each received control channel to establish a history of RSSI values; and determining motion of the portable communication device relative to the current best base station in response to the history of RSSI values; and if the portable communication device is moving away from the current best base station, registering to the potential best base station when potential best base station RSSI value exceeds current best base station RSSI value by a predetermined value.

13. A method for reducing power consumption in a portable communication device as recited in claim 12 wherein the method further comprises the steps of:

in the active mode, receiving at the portable communication device the first control channel;

determining an RSSI value for the first control channel;

when the RSSI value for the first control channel exceeds a predetermined threshold, returning to the low-power sleep mode; and when the RSSI value for the first control channel does not exceed the predetermined threshold, scanning at the portable communication device for another control channel.

14. A method for reducing power consumption in a portable communication device as recited in claim 12 wherein the registering step comprises the steps of:

determining a difference between a current best base station RSSI value and a potential best base station RSSI value;

in response to the difference, obtaining a re-registration count;

incrementing a re-registration counter by the re-registration count; and registering to the potential best base station when contents of the re-registration counter exceeds a predetermined threshold.

15. A method for reducing power consumption in a portable communication device, the portable communication device configured for communicating with one or more remote base stations which transmit a plurality of control channels, the method comprising the steps of:

maintaining a historical record of past communications originating at the portable communication device, the historical record including associated control channels and associated times;

in response to the historical record, predicting future control channels and a predicted time for a communication originating at the portable communication device;

intermittently searching for the predicted control channels at the predicted time; and when not searching, entering a low-power sleep mode.

16. A method for reducing power consumption in a portable communication device as recited in claim 15 wherein the method further includes the step of detecting associated control channels which are associated with a transmitting base station, each associated control channel including a base station identifier corresponding to the transmitting base station, and wherein the historical record includes base station identifiers for associated control channels which were detected by the portable communication device and associated times at which the control channels were detected.

17. A method for reducing power consumption in a portable communication device which is configured for communication with one or more base stations on one or more control channels, the method comprising the steps of:

maintaining at the portable communication device a control activity table, the control activity table including a record of detected control channels, associated signal quality parameters and associated times;

maintaining a current time at the portable communication device;

in response to the control activity table, determining a best base and best control channel for establishing communication with the best base; and in response to the current time, providing battery power to predetermined portions of the portable communication device at a time appropriate to detect communication from the best base on the best control channel.

18. A method as recited in claim 17 further comprising the steps of:

when communication is detected from the best base, initiating two-way communication with the best base;

otherwise, removing battery power from the predetermined portions of the portable communication device.

19. A method as recited in claim 17 wherein the associated signal quality parameters comprise received signal strength indications (RSSI).

20. A method as recited in claim 17 wherein the record of detected control channels comprises control channel frequencies.

* * * * *